United States Patent [19]
Caudle

[11] Patent Number: 6,004,384
[45] Date of Patent: Dec. 21, 1999

[54] ROTARY ADSORPTION APPARATUS

[75] Inventor: Wayne Caudle, Johnstown, Ohio

[73] Assignee: Bry-Air, Inc., Sunbury, Ohio

[21] Appl. No.: 09/089,336

[22] Filed: Jun. 3, 1998

[51] Int. Cl.[6] .................................................. B01D 53/06
[52] U.S. Cl. ............................... 96/125; 96/130; 96/150; 55/502
[58] Field of Search ........................ 55/502; 96/123–128, 96/130, 143, 145, 150

[56] References Cited

U.S. PATENT DOCUMENTS

| | | | |
|---|---|---|---|
| 2,662,607 | 12/1953 | Moragne | 96/125 |
| 2,700,537 | 1/1955 | Pennington | 96/144 X |
| 3,251,402 | 5/1966 | Glav | 96/125 |
| 3,398,510 | 8/1968 | Pennington | 96/125 X |
| 3,800,859 | 4/1974 | Norback | 96/125 |
| 4,060,913 | 12/1977 | Yoshida et al. | 96/125 X |
| 4,062,129 | 12/1977 | Yoshida et al. | 96/123 |
| 4,093,435 | 6/1978 | Marron et al. | 96/125 |
| 4,402,717 | 9/1983 | Izumo et al. | 96/144 X |
| 4,452,612 | 6/1984 | Mattia | 96/125 X |
| 4,865,637 | 9/1989 | Gruber | 55/502 X |
| 5,057,128 | 10/1991 | Panzica et al. | 96/123 |
| 5,167,680 | 12/1992 | Gardner | 55/502 X |
| 5,238,052 | 8/1993 | Chagnot | 96/125 X |
| 5,484,466 | 1/1996 | Brown et al. | 55/502 X |
| 5,755,843 | 5/1998 | Sundquist | 55/502 X |
| 5,800,584 | 9/1998 | Hinderer et al. | 55/502 X |

FOREIGN PATENT DOCUMENTS

| | | | |
|---|---|---|---|
| 2460401 | 7/1975 | Germany | 96/125 |
| 57-014207 | 3/1982 | Japan | 96/125 |
| 1-022323 | 1/1989 | Japan | 96/125 |
| WO91/16964 | 11/1991 | WIPO | 96/150 |

Primary Examiner—Robert Spitzer
Attorney, Agent, or Firm—Porter Wright Morris & Arthur LLP

[57] ABSTRACT

An apparatus for removing moisture from an air or gas stream by adsorption is disclosed. More particularly, the invention relates to an improved seal and method for removing the seal and an improved L-, V-, or pie-shaped duct that promotes laminar flow (viz. not turbulent) of a moisture- or solvent-laden stream within the rotary adsorption apparatus. This, in turn, reduces the amount of insulation needed as well as isolates the heated duct from the exterior surfaces. The method allows for simplified maintenance of the rotary adsorption apparatus in comparison with conventional seals, which are typically riveted, screwed, or mechanically attached to an adsorption apparatus.

20 Claims, 7 Drawing Sheets

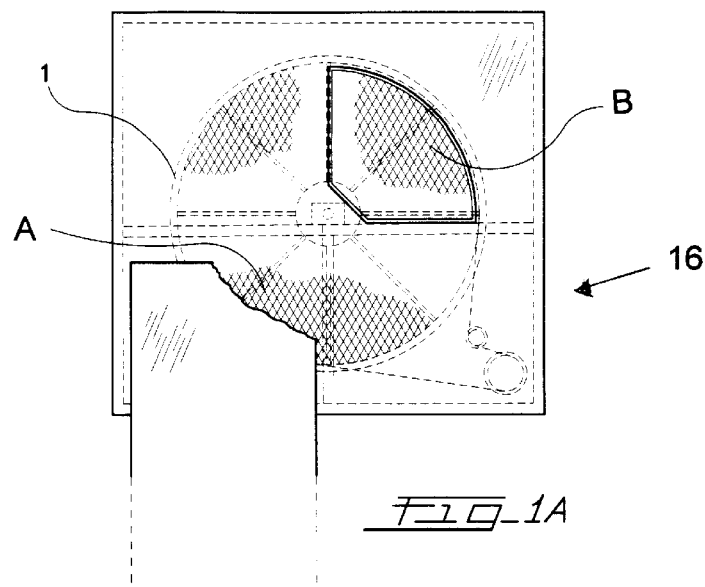
FIG_1A
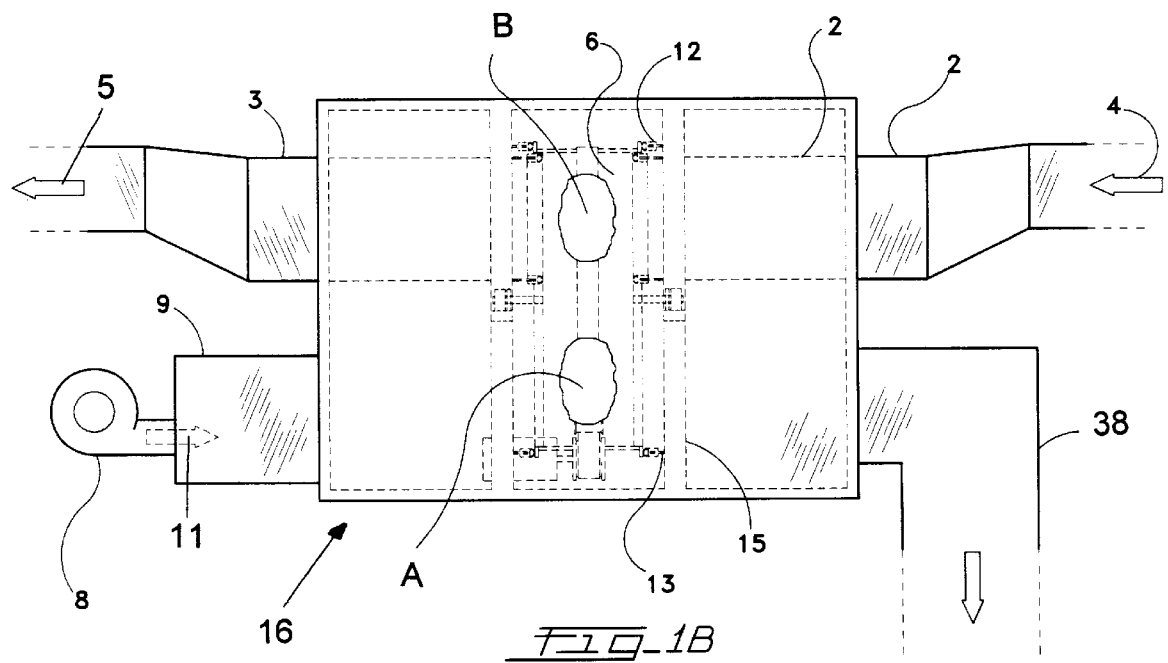
FIG_1B

FIG_5.

FIG_6.

ROTARY ADSORPTION APPARATUS

FIELD OF INVENTION

This invention relates to an apparatus for removing moisture from an air or gas stream by adsorption. More particularly, this invention relates to an improved seal and method for removing the seal and an improved L-, V-, or pie-shaped duct that promotes laminar flow (viz. not turbulent) of a moisture- or solvent-laden stream within the rotary adsorption apparatus. This, in turn, reduces the amount of insulation needed as well as isolates the heated duct from the exterior surfaces. The method allows for simplified maintenance of the rotary adsorption apparatus in comparison with conventional seals, which are typically riveted, screwed, or mechanically attached to an adsorption apparatus.

BACKGROUND

Rotary adsorption apparatuses are found in residential, commercial, and industrial environments. Specifically, rotary adsorption apparatuses may be used in industrial processes, product drying, material storage, comfort conditioning, air/gas treatment, and solvent recovery. Generally, a rotary adsorption apparatus removes moisture or a solvent from a moisture-laden air or gas stream by exposing this stream to an adsorption media such as a desiccant. (For simplicity of reference, the phrase "moisture-laden air or gas" will be used to represent both moisture- and solvent-laden air or gas streams when describing the manner in which a rotary adsorption apparatus operates. It should be noted that although the term adsorption is used herein, the adsorption medium could also be described as a medium for adsorbing excess moisture.)

One type of adsorption system includes a cylindrical adsorption medium-filled bed in which a thickness of the medium is covered on each side with circular perforated sheet metal disks to permit controlled air or gas passage through the bed. One or more dividers, comprised of a flexible material, radially separates the bed into sections. Dividers serve the purpose of separating the moisture-laden stream from the drier higher temperature air or gas stream. The adsorption medium in the cylindrical bed continuously rotates, exposing different portions of the bed to the process air or gas stream and to the drier air stream.

One section of the bed is utilized for drying a moisture-laden air or gas stream. This section of the bed is referred to as Section A in FIG. 1. The moisture adsorbs to the adsorbent bed. The air or gas stream then exits the adsorption apparatus drier than when it first entered Section A of the apparatus.

The other section of the adsorption bed, referred to as Section B in FIG. 1, has the moisture removed from the pores of the adsorption medium by a stream of heated air or steam. Once the moisture is removed from Section B, this section is then regenerated and is ready to repeat the adsorption process.

In addition to the divider that separates the moisture-laden stream from the dry air stream within the adsorption bed, an elongated flexible seal is secured to the perimeter flange on both ends of the housing for the rotary adsorption apparatus. This seal further separates the two streams from one another. Connected to the housing is the perimeter flange. The perimeter flange surrounds the face of the adsorbent container.

The entire adsorption bed is rotated around a permanent adsorption bearing by a rotor (viz., the rotating part of the motor that includes a shaft and a rotary driver). This, in turn, rotates a drive belt that has treads that interconnect with a drive wheel that is connected to the housing. Alternatively, a timing belt may be used that has cogs on both the belt and on the exterior of the rotating adsorption bed. See U.S. Pat. No. 4,775,484 issued to Robert N. Schmidt. Mounting angles may be used to secure parts to the rotary adsorption apparatus. For example, mounting angles may be used to fix the heat source assembly in place. Covers to these mounting angles may use polytetrafluoroethylene or Teflon® tape. See U.S. Pat. No. 5,238,052 issued to Bruce J. Chagnot on Aug. 24, 1993.

Conventional rotary adsorption apparatuses are disassembled by first supporting the rotor to allow unfastening of the bolts that secure a flange plate along with a shaft extension to the face of the wheel. See FIG. 1. A pillow-block bearing is typically used to support this assembly. If the operator is unable to remove the housing for the adsorption medium, the screws or rivets used to secure the seal to the perimeter flange must be removed.

A problem with the conventional seals used in adsorption apparatuses is that a typical system uses fasteners such as screws or rivets to secure the seal to a perimeter flange. Using fasteners hinders servicing of the adsorption apparatus. Tools are needed to remove the fasteners to allow the operator to take off the seal and perform maintenance on the adsorption apparatus. Additionally, typical seal designs are known to damage the relatively fragile face of rotary absorbers. Moreover, the shaft of the rotor is supported by a pillow-block type bearing making subsequent disassembly more difficult.

SUMMARY OF INVENTION

The invention described herein overcomes the problems found in conventional adsorption apparatuses. First, the seal in the present invention is secured to the perimeter flange without fasteners by way of a slit base. The dimension of this slit may change depending upon the size of the perimeter flange in which the seal is fitted. This distinctive feature of the present invention allows the seal to be easily installed or replaced. (For example, in a apparatus having a flange that has a diameter of 0.06 centimeters, a slit in a seal approximately 3 centimeters in depth and 0.065 centimeters in width is expected to yield satisfactory results.) Moreover, the seal can be easily removed from the perimeter flange for the purpose of performing maintenance on the rotary adsorption apparatus. The slit base of the seal is comprised of rubber or rubber-like material allowing the base of the seal to be frictionally attached to the perimeter flange. Repair of the adsorption apparatus is made easier by this seal design because tools are no longer needed to remove fasteners in order to remove the seal. The low-friction surface of the seal and face of the adsorption medium affords each of these items extended life.

Moreover, this invention uses a distinctive approach for supporting a rotary adsorption apparatus for disassembly. A shaft in the rotor is fixed in place by a clamping means and a permanent adsorber bearing. The shaft is supported by a support member allowing ease of access to, and removal of, the rotary adsorber apparatus. The permanent adsorber bearing, holds the shaft in place, allowing the rotary adsorption apparatus to be translated on the horizontal axis of the horizontal support members.

BRIEF DESCRIPTION OF THE DRAWINGS

FIG. 1A is an end view of a conventional rotary adsorption apparatus.

FIG. 1B is a side view of a conventional rotary adsorption apparatus.

DESCRIPTION OF THE PREFERRED EMBODIMENTS

Figure 2:
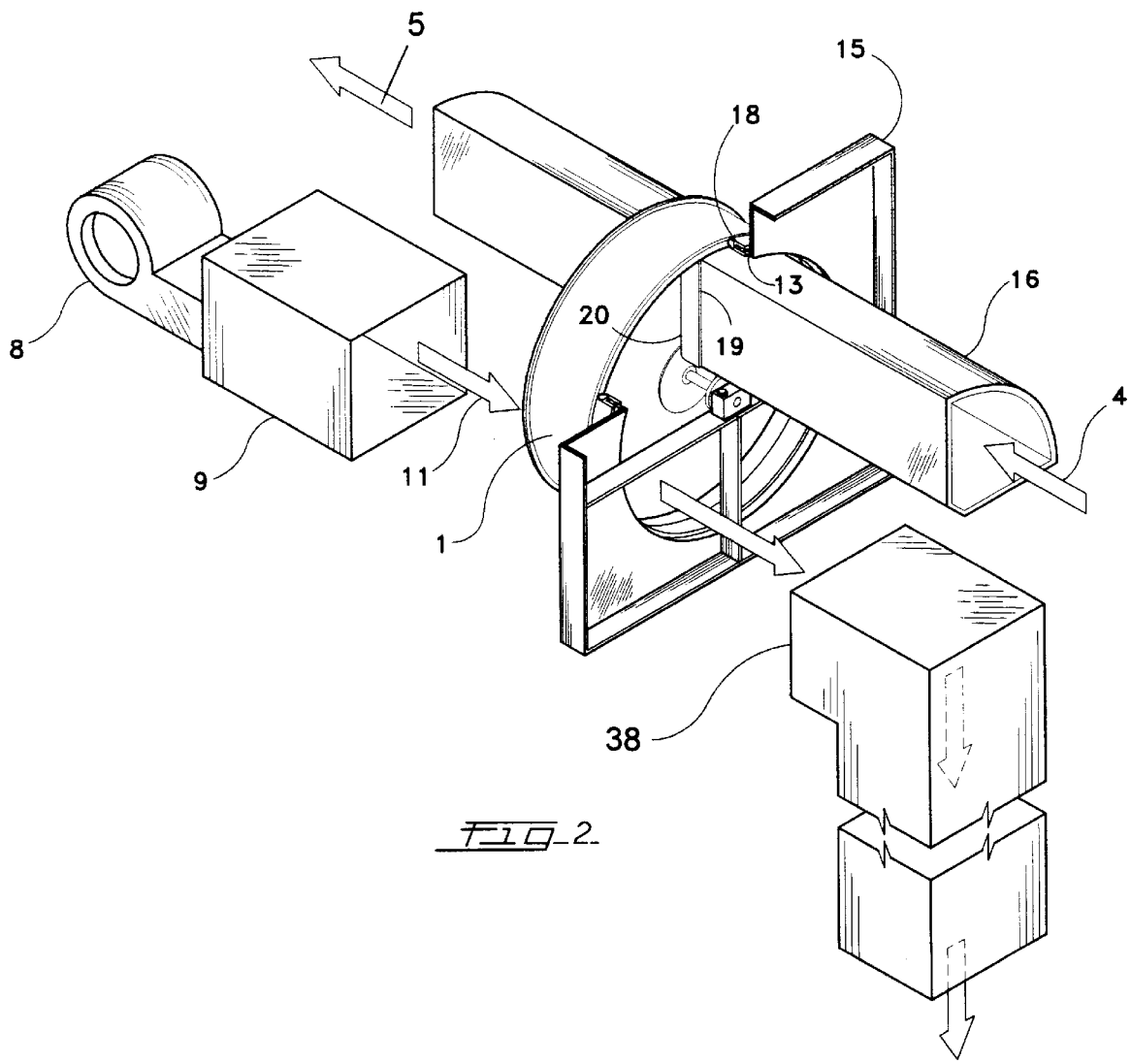
FIG. 2 is a side elevational view of a typical cross-sectioned rotary adsorption apparatus and a seal fitted to the perimeter of the present invention.

Generally, a rotary adsorption apparatus removes moisture from a moisture-laden air or gas stream by exposing the moisture-laden stream to an adsorption medium such as a desiccant. The typical apparatus includes an adsorption bed that has one or more dividers. These dividers separate the moisture-laden stream from the higher temperature air or gas stream used to reactivate the adsorption bed. Reactivation is achieved by the removal of moisture or solvent from the adsorbent. By separating the two streams from one another, the moisture-laden stream travels through the adsorption bed where the moisture adsorbs to the medium. To further separate the moisture-laden stream from the higher temperature countercurrent air or gas stream, a seal is generally used. A preferred embodiment of the invention has a seal slit at its base. This slit base allows the seal to be easily inserted onto a perimeter flange of the housing of the rotary adsorption apparatus. The dimension of this slit may change depending upon the size of the perimeter flange in which the seal is fitted. This distinctive feature allows the seal to be easily installed or replaced. Moreover, the seal can be easily removed from the perimeter flange for the purpose of performing maintenance on the rotary adsorption apparatus.

The top of the seal and the perimeter flange are preferably coated with a low-friction material. Graphite or polytetrafluoroethylene are the preferred coatings to be applied to both the seal and the perimeter flange. An attachment material such as glue is used to fix the graphite or polytetrafluoroethylene to the top of the seal in the present invention. These coatings improve the performance of conventional seals. Conventional seals need to be replaced approximately once a year from the date on which they are first used. Some conventional seals damage the face of the adsorption container because the seal either has a coating that is too thick or the seal lacks a coating creating friction between the seal and the face of the adsorber. Additionally, because typical perimeter flanges are made of a soft metal like aluminum, a low-friction coating applied to the perimeter flange extends its life because there is less friction between the perimeter flange and the face of the adsorption container. Therefore, the soft metal comprising the surface of the perimeter flange that contacts the face of the adsorption container does not wear as quickly as it would without the low-friction surface being applied.

FIGS. 1A and 1B show the air flow pattern through a rotary adsorption apparatus 16 and the seals 12. An air or gas stream 4 that requires removal of moisture or solvent enters the inlet orifice 2, passes through a section of the adsorbent bed 6 in the adsorbent container 1, and after the passing through the adsorbent bed 6, an exit air or gas stream 5 exits at outlet 3. The adsorbent contained in section A of the adsorbent bed 6 of the rotary adsorption apparatus 16 undergoes reactivation. A reactivation air or gas stream 11 is passed through a blower 8, a heat source 9, and a hose or duct 38 connected to reactivation section A of the adsorbent bed 6 eliminating moisture adsorbed in the section B of the adsorbent contained during the prior process step of the cycle. The adsorbent in section A of the adsorbent bed 6, which previously was subjected to reactivation, is maintained in the cooling step of a cycle immediately prior to the time when this adsorbent container 1 is once again used in the process step of the cycle. The seals 12 are frictionally secured to a perimeter flange 13 connected to the housing 15 in the adsorption medium.

Figure 3:
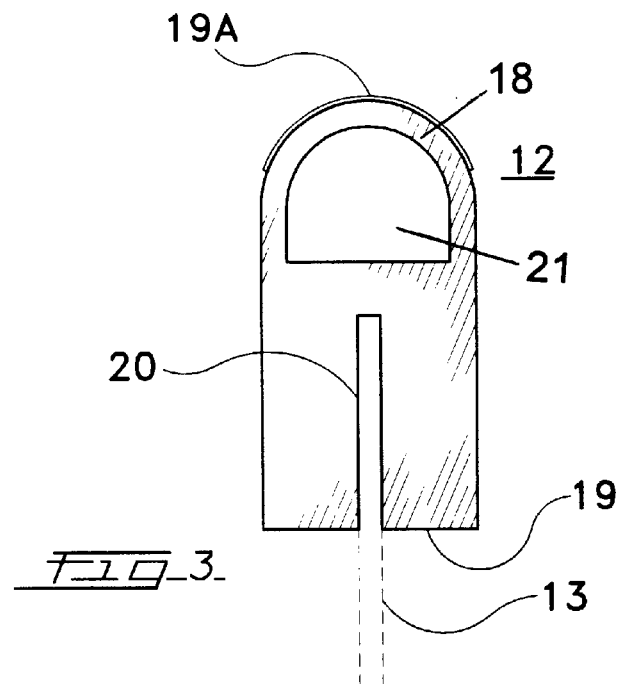
FIG. 3 is an end view of the elongated flexible seal flange of the present invention.

Referring to FIG. 2, a heat source 9, an adsorption container 1 with a perimeter flange 13 provide for two oppositely directed air or gas streams 5,11 to pass through the blower 8 and heat source 9. The top side 18 of the elongated flexible seals 12 are coated with a low-friction coating 17 such as graphite or polytetrafluoroethylene, as shown in FIG. 3. The coating 17 is attached to the top side 18 of the flexible seal 12 and the perimeter of the flange 13. The base 19 of the elongated flexible seal 12 has a rectangular slit 20 that is frictionally attached to the perimeter flange 13. The perimeter flange 13 is attached to the housing 15. A diffuser duct 38, a part of the housing 15, promotes laminar (viz. not turbulent) flow of an air stream 11.

Figure 4:
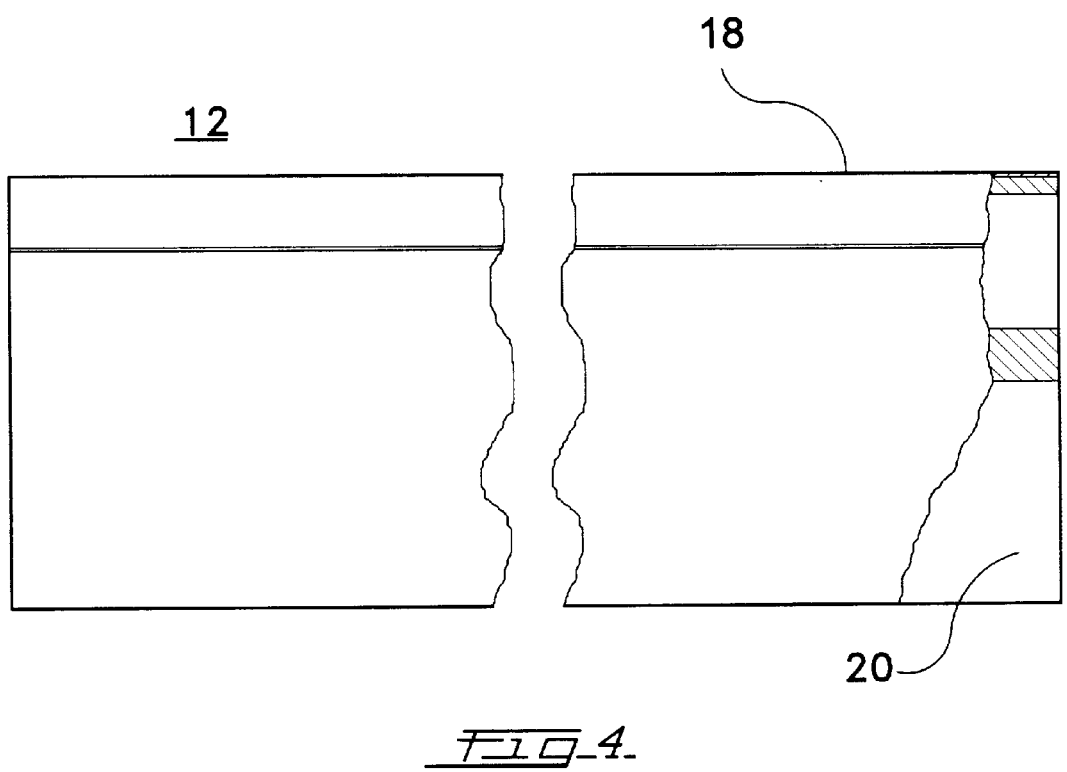
FIG. 4 is a side view of the elongated flexible seal of the present invention.
Figure 6:
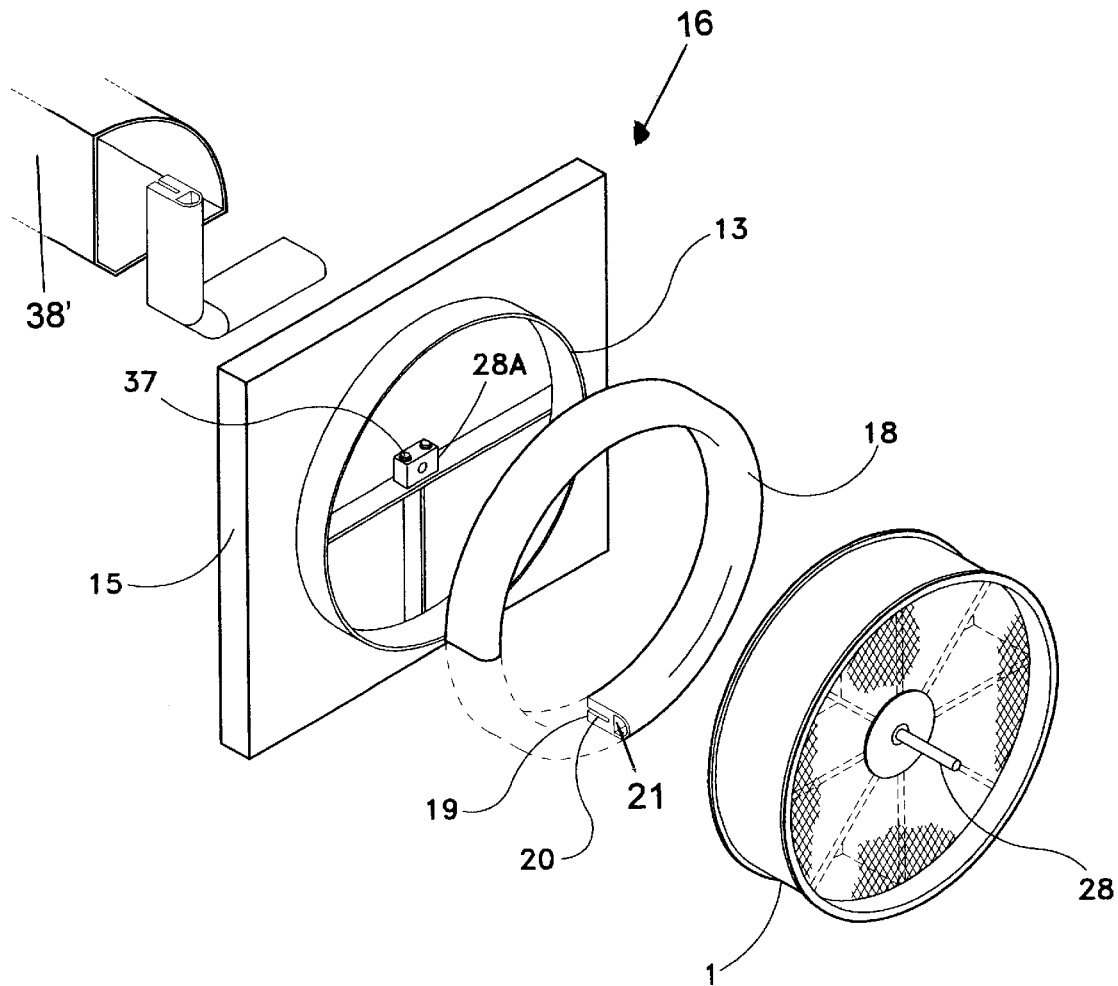

In the preferred embodiment shown in FIGS. 3–4 and 6, the top 18 of the elongated flexible seal 12 has a hollow O-ring 21. The slit 20 of the seal 12 is fitted onto the perimeter flange 13. The slit 20 in the base 19 is preferably rectangular in shape. However, other shapes may also be suitable depending upon the shape of the perimeter flange or other characteristics of the apparatus 16 to which the seal 12 is being attached.

Figure 5:
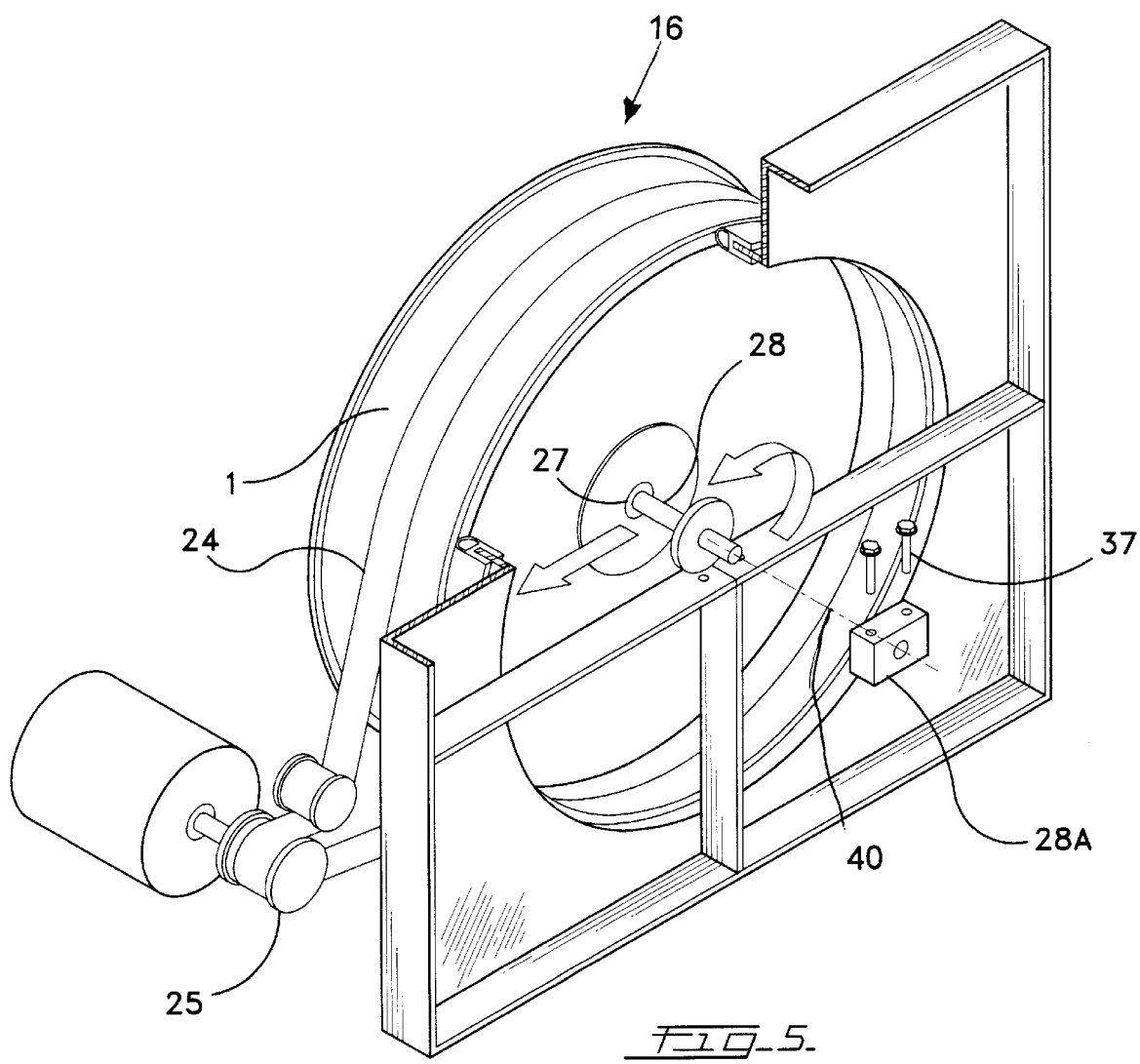
FIGS. 5–6 show the manner in which the rotary adsorption apparatus is disassembled under the present invention.

FIGS. 5–6 show the manner in which the rotary adsorption apparatus 16 is disassembled. Removable fasteners 37 are used to secure the rotary adsorption apparatus 16 in place. The belt 24 contacts the adsorption container 1. The belt 24 is pulled along a horizontal axis 40 of rotor 25, allowing the rotor 25 to roll forward and out along the roll-out wheel (not shown) and away from housing 15. A permanent adsorber bearing 27 is the central bearing in the rotary adsorption apparatus 16 and is connected to a shaft 28. The shaft 28 is supported by a supporting member 28A. The permanent adsorber bearing 27 allows the rotary adsorption apparatus 16 to be more easily disassembled because the permanent adsorption bearing 27 is removable. Since the permanent adsorption bearing 27 is removable, the shaft 28 may be loosened from the adsorption container 1 and the rotor 25 may be pulled out. The permanent adsorber bearing 27 provides a low-cost, non-rotating, shaft assembly design that effectively simplifies service and mounting of the rotary adsorption apparatus 16.

Figure 7:
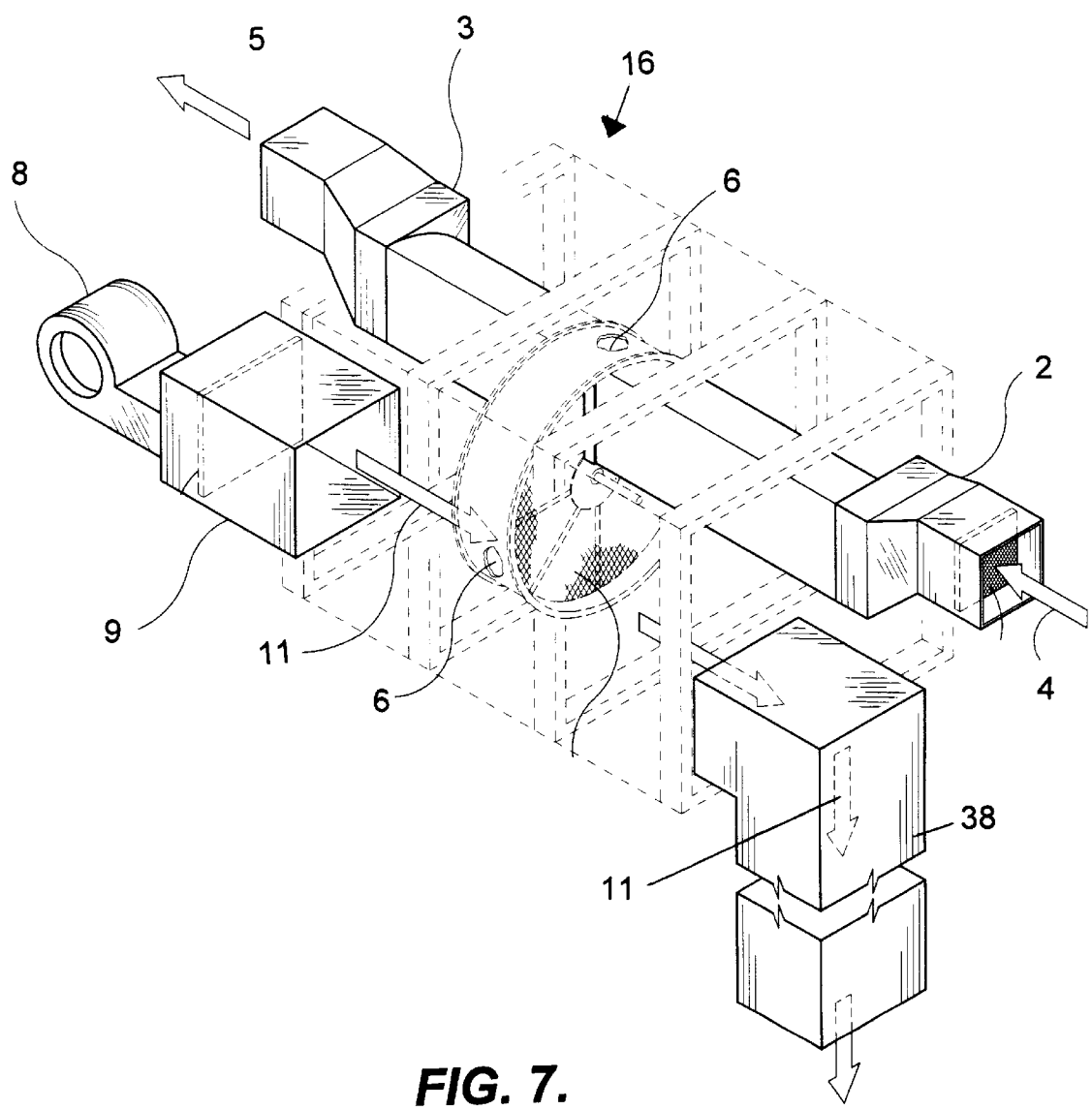
FIG. 7 shows a cross-sectional view of a diffuser duct attached to the rotary adsorption apparatus.
Figure 8:
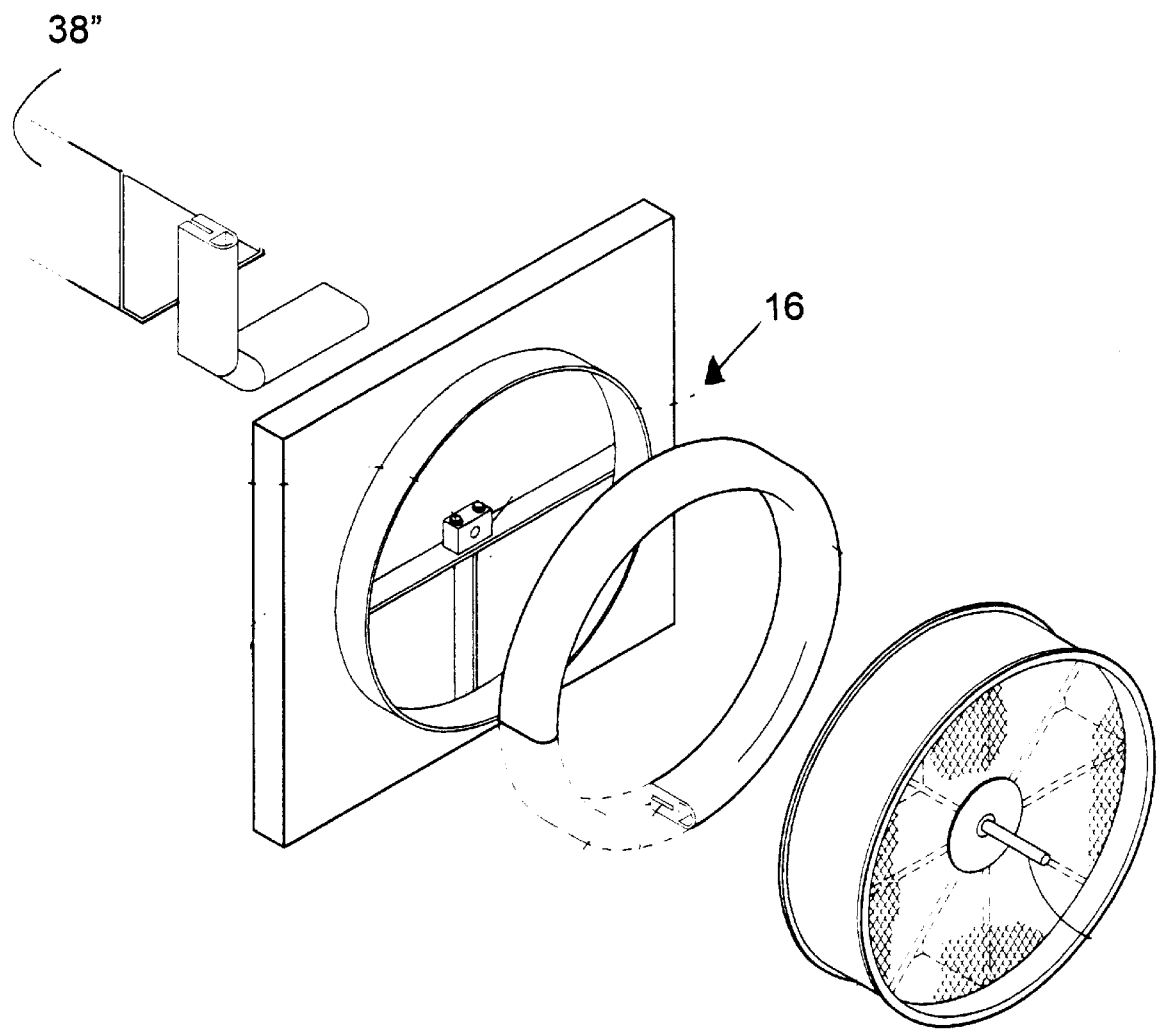
FIG. 8 shows a perspective view of one embodiment of the diffuser duct of the rotary adsorption apparatus.

Referring to FIG. 7, the rotary adsorption apparatus 16 is connected to an L-shaped duct 38. The rotary adsorption apparatus may also be connected to a pie-shaped duct 38' as shown in FIG. 6 or a V-shaped duct 38" as illustrated in FIG. 8. The entry air or gas stream 4 that requires removal of moisture or solvent enters the rotary adsorption apparatus 16 through inlet orifice 2, and exit air or gas stream 5 exits the rotary adsorption apparatus through outlet orifice 3. The entry stream 4 enters the inlet orifice 2 and passes through a section of the adsorbent bed 6. The adsorbent container 1 in section A of the adsorbent bed 6 of the rotary adsorption apparatus 16 undergoes reactivation. Reactivation is achieved by the removal of moisture or solvent from the adsorbent. A reactivation air or gas stream 11 is passed through a blower 8, a heat source 9, and a hose or duct 38 connected to reactivation section A of the bed eliminating moisture adsorbed in the section B adsorbent container 1 during the prior process step of the cycle. The adsorbent container 1 in section B of the bed, which previously was subjected to reactivation, is maintained in the cooling step of a cycle immediately prior to the time that this adsorbent container is once again used in the process step of the cycle. A blower 8 and heat source 9 for the two process sections are provided.

The casing of the duct 38 is V-, L-, or pie-shaped and promotes the laminar flow of the higher temperature air or gas streams 5,11. These shapes of the duct directly affect the heat distribution within the rotary adsorption apparatus 16 and allow the insulation to be reduced by at least one-half of the typical amount of insulation used.

While the foregoing is a description of preferred embodiments of the seal and methods of disassembling the rotary adsorption apparatus, it is evident that other equivalent means may be used to secure the seal without fasteners to the perimeter flange. Additionally, other low-friction materials may be used on the top side of the flange and the perimeter flange. Thus, the description is illustrative rather than limiting as to the number of the embodiments to which the invention may be adapted and it is not intended to exclude such other variations that may be adopted from the foregoing description of the preferred embodiment.

What is claimed:

1. A rotary adsorption apparatus, comprising:

a container;

a housing surrounding said container;

a rotor located within said housing, said rotor rotating said container, said rotor being connected to said container by a belt;

a permanent adsorber bearing about which said container rotates, said permanent adsorber bearing being connected to said housing by a support member;

a perimeter flange attached to said housing;

one or more dividing separators within said housing; and, a seal having a top side and a base, said base having a slit for receiving said perimeter flange, said base being frictionally secured to said perimeter flange, said seal being coated with a low-friction material.

2. The rotary adsorption apparatus of claim 1 wherein said low-friction material is selected from the group consisting of graphite and polytetrafluoroethylene.

3. The rotary adsorption apparatus of claim 1 further comprising:

an inlet for intaking a gas stream into said container; and, an outlet for outputting said gas stream from said container, said outlet comprising a duct, said duct being shaped to promote a laminar flow of said gas stream.

4. The rotary adsorption apparatus of claim 3 wherein said duct is V-shaped.

5. The rotary adsorption apparatus of claim 3 wherein said duct is L-shaped.

6. The rotary adsorption apparatus of claim 3 wherein said duct is pie-shaped.

7. The rotary adsorption apparatus of claim 1 wherein said seal has a hollow O-ring located therein.

8. A seal for a perimeter flange of an adsorption apparatus, comprising:

a top side, said top side of said seal has a hollow O-ring located therein; and, a base attached to said top side, said base having a slit for receiving said perimeter flange, said base being frictionally fitted to said perimeter flange.

9. The seal of claim 8 wherein said top side of said seal has a low-friction coating thereon.

10. The seal of claim 9 wherein said low-friction coating is selected from the group consisting of graphite and polytetrafluoroethylene.

11. The seal of claim 9 wherein said low-friction coating is graphite having a thickness less than 3.0 millimeters.

12. The seal of claim 9 wherein said low-friction coating is graphite having a width less than 3.0 centimeters.

13. The seal of claim 9 wherein said low-friction coating is polytetrafluoroethylene having a thickness less than 3.0 millimeters.

14. The seal of claim 9 wherein said low-friction coating is polytetrafluoroethylene having a width less than 3.0 centimeters.

15. The seal of claim 9 wherein said low-friction material has a width of approximately 1.5 millimeters.

16. The seal of claim 8 wherein said top side of said seal is curved.

17. The seal of claim 8 wherein said top side of said seal has a thickness of approximately 1.0 millimeter.

18. The seal of claim 8 wherein said slit in said base of said seal has a width of approximately 0.08 millimeter.

19. The seal of claim 8 wherein said slit in said base of said seal has a depth of approximately 2.5 centimeters.

20. A method of disassembling a rotary adsorption apparatus including a fastener, a shaft, supporting member, a rotor, a belt, a permanent adsorber bearing, a perimeter flange, and a seal, said method comprising the steps of:

removing said fastener that fastens said shaft to said cross-support;

pulling said belt along a horizontal axis of said rotor;

removing said permanent adsorption bearing; and, pulling out said rotor.

* * * * *